United States Patent
Turner

(10) Patent No.: US 7,683,788 B2
(45) Date of Patent: Mar. 23, 2010

(54) READER FOR RFID TRANSPONDERS AND CORRESPONDING METHOD

(75) Inventor: Christopher Gordon Gervase Turner, Oakley (GB)

(73) Assignee: ZIH Corp., Hamilton (BM)

( * ) Notice: Subject to any disclaimer, the term of this patent is extended or adjusted under 35 U.S.C. 154(b) by 666 days.

(21) Appl. No.: 10/595,529

(22) PCT Filed: Oct. 25, 2004

(86) PCT No.: PCT/GB2004/004505

§ 371 (c)(1),
(2), (4) Date: Mar. 26, 2007

(87) PCT Pub. No.: WO2005/043447

PCT Pub. Date: May 12, 2005

(65) Prior Publication Data

US 2007/0252698 A1 Nov. 1, 2007

(30) Foreign Application Priority Data

Oct. 27, 2003 (GB) ................................. 0325026.3

(51) Int. Cl.
*G08B 13/14* (2006.01)
(52) U.S. Cl. .................... 340/572.2; 340/10.2
(58) Field of Classification Search .............. 340/572.2, 340/572.1, 572.4, 10.1, 10.2, 10.3, 505
See application file for complete search history.

(56) References Cited

U.S. PATENT DOCUMENTS

| | | | | |
|---|---|---|---|---|
| 5,621,199 A | | 4/1997 | Calari et al. | |
| 5,714,937 A | * | 2/1998 | Campana, Jr. | 340/572.7 |
| 5,973,613 A | | 10/1999 | Reis et al. | |
| 5,977,913 A | * | 11/1999 | Christ | 340/825.36 |
| 6,429,775 B1 | * | 8/2002 | Martinez et al. | 340/572.1 |
| 6,617,962 B1 | | 9/2003 | Horwitz et al. | |
| 6,812,839 B1 | * | 11/2004 | Belcher et al. | 340/572.1 |
| 7,218,229 B2 | * | 5/2007 | Boyd | 340/572.1 |
| 7,317,378 B2 | * | 1/2008 | Jarvis et al. | 340/10.1 |
| 2003/0174764 A1 | | 9/2003 | Mahany | |
| 2006/0244598 A1 | * | 11/2006 | Hyde et al. | 340/572.1 |
| 2007/0120650 A1 | * | 5/2007 | Nagai et al. | 340/10.2 |
| 2008/0290997 A1 | * | 11/2008 | Kim et al. | 340/10.4 |

FOREIGN PATENT DOCUMENTS

| | | |
|---|---|---|
| EP | 0 899 677 A2 | 3/1999 |
| WO | WO 94/14267 A1 | 6/1994 |

* cited by examiner

*Primary Examiner*—John A Tweel, Jr.
(74) *Attorney, Agent, or Firm*—Alston & Bird LLP

(57) ABSTRACT

An RFID reader system comprises one or more transceiver modules (10) for communicating with a plurality of RFID tags, a control unit (8) having a reference frequency generator for providing a reference frequency to said one or more transceiver modules (10), a control bus (16) connecting the control unit (8) to said one or more transceiver modules (10) for communicating with said one or more transceiver modules (10) and the control unit (8) having a communications port allowing the control unit to communicate with an application host system. The control unit (8) provides a common reference frequency to said transceiver modules. The invention also relates to a method of reading tags, comprising the steps of providing a plurality of transceiver modules (10) with a common reference frequency, and controlling at least one of the transceiver modules (10) from a control unit (8) to read one or more of the plurality of tags.

21 Claims, 2 Drawing Sheets

READER FOR RFID TRANSPONDERS AND CORRESPONDING METHOD

FIELD OF INVENTION

This invention refers to Radio Frequency Identification and more particularly to RFID methods and reader systems used to read transponders or radio frequency identification Tags.

BACKGROUND TO TEE INVENTION

Radio Frequency Identification (RFID) systems comprise a Reader otherwise known as an Interrogator or Scanner and a plurality of Tags also known as Transponders or Electronic Labels. Systems designed for low cost applications to identify or track items may use so called Passive Tags which rely on the transmitted energy field from reader to provide their operating power and to provide a carrier signal on which they can use varying impedance modulation to signal their identity or to transmit their energy for reception by the reader. This form of modulation is commonly referred to as backscatter modulation.

Passive Tags may optionally incorporate a battery to provide energy to power the circuits on the Tag but they rely on backscatter modulation to communicate their identity. These tags are called Battery assisted Passive Tags. RFID Tagging systems employing these types of tags to communicate over ranges of more than 1 meter are designed to operate in the UHF or microwave bands, typically at frequencies in the region of 433 MHz or 860 to 960 MHz or 2.45 GHz. However these are not the only frequencies used for RFID systems.

A variety of communications protocols are used to enable the reading of multiple tags present in the operating field of the reader. These protocols are called arbitration protocols, also referred to as collision arbitration or anti-collision protocols. These protocols may use either Aloha hold-off and retry arbitration or tree walking or binary search protocols to arbitrate populations of tags present. The International Standard ISO/IEC FCD 18000 describes a number of such systems in use at different operating frequencies. Tags may be attached to items examples of which are bottles of detergent or chemicals, items of clothing, motor spares, electronic assemblies, cartons, plastic crates used in transporting perishable foods, pallets, roll cages or any other item one can imagine.

Tags may also be embedded in consumer products or other items in order to provide life cycle tracking and management. The items to which tags are attached affect the radio frequency performance of the tags or the direction from which tags can be read or the operating range of tags. In order to read tags in many situations the reader system must be configured as a portal reader in which individual reader antennas are mounted around the portal in order to provide adequate signal levels to the tags or to permit the reception of the backscatter signal from the tags. The antennas in such a system may be switched or multiplexed to provide a wider angle of radiation or greater reader volume than is possible with a single antenna as described in U.S. Pat. No. 6,367,697 Entitled "A Reader Arrangement for an Electronic Identification System Having a Plurality of Reader Heads for Energising Transponders" incorporated herein by reference. The antennas in such a system may also be combined such that all the antennas are energised simultaneously.

In the multiplexed arrangement it is possible that a number of tags out of the plurality of tags in the reader field may not receive adequate illumination of RF energy from the reader, or that the tags are arranged such that they may be illuminated by the energising signal from the reader but are in a receive null and therefore their backscatter signal from the tag is not visible to the receiver in the reader. In the combined arrangement, all antennas radiate a signal from the reader and therefore could potentially provide a solid reading field. However due to reflections and phase differences at different points in the reading volume resulting from phase changes due to propagation from the multiple antennas, energy nulls may occur in the volume and therefore tags which are placed in these nulls may never be energised or may never be visible to the receiver in the reader. It has been observed that it is possible for tags to be energised but for the response signal to not be received by the receiver in the reader.

Yet another problem with using a single reader with multiplexed multiple reader antennas results from the transmit power and receiver signal losses associated with the loss in the transmitter feedlines used to couple the reader to the antennas. In a typical 3 meter wide portal system, cables can be as long as 12 meters resulting in a power and signal loss of 6 dB or more depending on the characteristics of the feeder cable used. It is possible to reduce the loss in the cable by using coaxial cable having a larger cross sectional area, however these cables are difficult to install due to their large diameter and weight. They are also expensive and so do not provide a practical solution to the problem of cable loss.

OBJECT OF THE INVENTION

It is the object of this invention to at least alleviate one or more of these disadvantages.

SUMMARY OF THE INVENTION

According to one aspect of the invention, there is provided an RFID reader system comprising one or more transceiver modules for communicating with a plurality of RFID tags, a control unit having a reference frequency generator for providing a reference frequency to said one or more transceiver modules, a control bus connecting the control unit to said one or more transceiver modules for communicating with said one or more transceiver modules and the control unit having a communications port allowing the control unit to communicate with an application host system.

In a preferred embodiment the system comprises a plurality of transceiver modules, the control unit providing a common reference frequency to said transceiver modules.

In one embodiment the system comprises a plurality of transceiver modules and the control unit can control at least one of the transceiver modules to read one or more of the plurality of tags. The transceiver modules can be arranged to transmit individually or in groups or simultaneously. Alternatively, or in addition, the control unit can control each of the transceiver modules to be activated in rotation, or in a random or pseudo-random sequence to read one or more of the tags.

In the system one or more, but not all, of the transceivers may be arranged to transmit an energising signal while one or more of the other transceivers have their receivers active to serve as diversity receivers.

In one embodiment of the system, the frequency of at least one or more of the plurality of transceivers has its reference frequency offset from the others thereby providing a low frequency beat note which can be adjusted to fall below the cut off frequency of the detector in the tags.

According to another aspect of the invention, there is provided a method of reading tags, comprising the steps of providing a plurality of transceiver modules with a common reference frequency, and controlling at least one of the transceiver modules to read one or more of the plurality of tags. In one embodiment the method includes controlling the transceivers to transmit individually or in groups or simultaneously. Alternatively, or in addition, the method may include the step of controlling each of the transceiver modules to be activated in rotation, or in random or pseudo-random sequence to read one or more of the tags.

The method may include one or more, but not all, of the transceivers transmitting an energising signal to the tags while one or more of the other transceivers have their receivers active to serve as diversity receivers.

In another embodiment the method includes controlling the frequency of at least one or more of the plurality of transceivers to have its reference frequency offset from the others thereby providing a low frequency beat note which can be adjusted to fall below the cut off frequency of the detector in the tags.

Other embodiments of the method and system of the invention are defined in the claims.

DESCRIPTION OF TIE INVENTION

The invention will be described further, by way of examples, with reference to the accompanying drawings in which.

Figure 1:
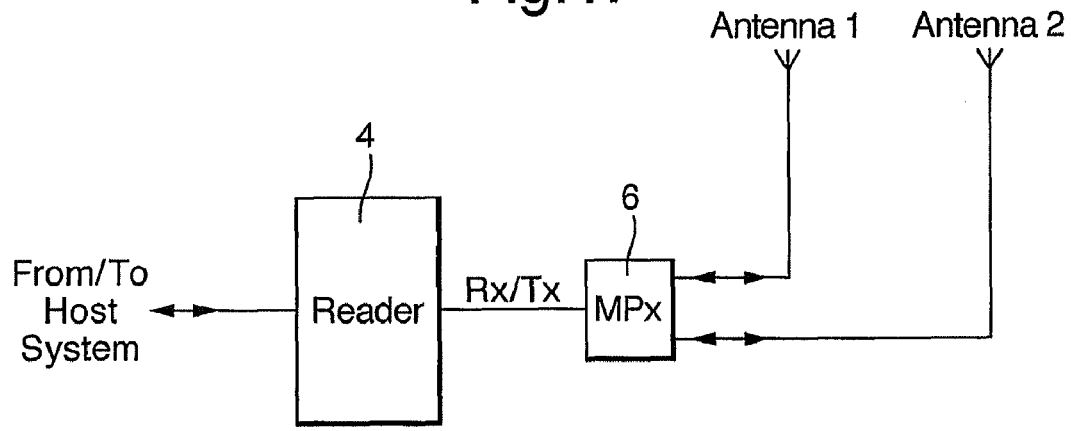
FIG. 1 is a reader system known in the prior art

A prior art system as illustrated in FIG. 1. It has a reader 4 and a plurality of read heads or antennae (1, 2) activated in a time-multiplexed manner, by multiplexer (6), with a cycle time less than the reset times of the transponders or tags associated with the articles to be counted or identified. The reader is set up as a portal reader arrangement (not specifically shown) and the concept is to try and reduce errors when reading a lot of tags being scanned by the reader arrangement. However, as described above errors can still arise caused by nulls in the volume interrogated within the portal.

Figure 2:
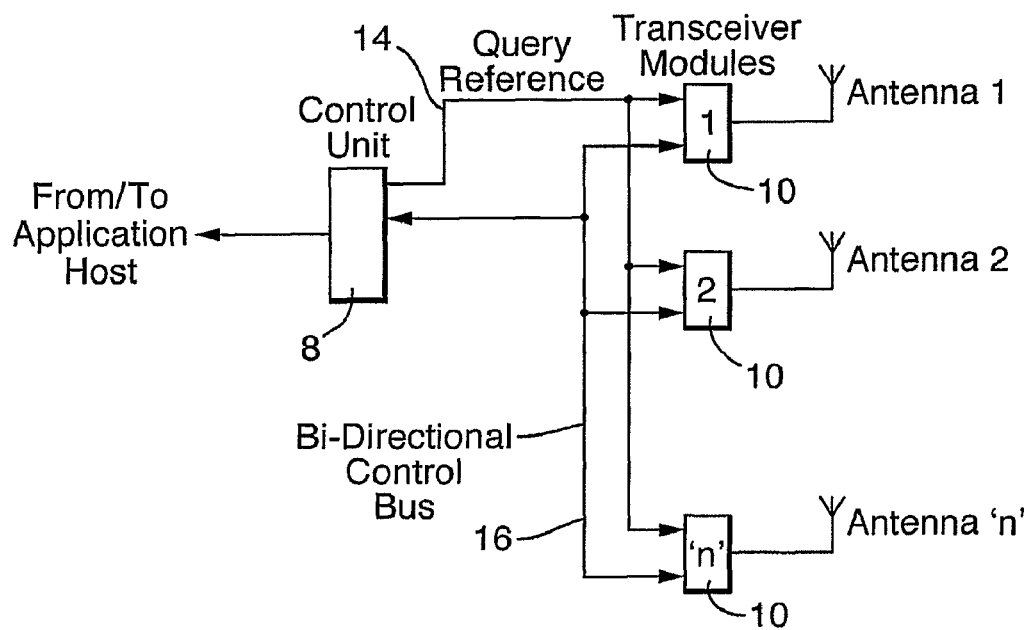
FIG. 2 is a block diagram of a reader system according to one embodiment of the invention and FIG. 3 is a block diagram of a reader transceiver module according to an embodiment of the invention.

FIG. 2 is a reader system and apparatus according to one embodiment of the invention. It comprises a control unit (8) separate from one or more individual transceiver modules (10) which may or may not be attached to antennas (1, 2 ... 'n'.). Each transceiver module (10), shown in more detail in FIG. 3, incorporates a frequency generator (20,22), a transmitter power amplifier (26), a modulator (24), a receiver (28) having one or more channels, a data decoder (30) for each of the channels to demodulate or decode the received data stream and a communications interface (32) used to connect the module (10) to the control unit (8). The transceiver modules (10) are described in more detail later with reference to FIG. 3.

The control unit (8) has an interface which is used to communicate with a host computer system by means of a serial interface, Ethernet or similar and an interface to match that used on the transceiver module which is used to control one or more transceiver modules (10). The control unit (8) also contains a frequency source which is used as a reference frequency for the one or more transceiver modules (10).

The reader may be configured as a single stand-alone reader or may be installed as a reader system having multiple antennas.

The transceiver module (10) generates its operating frequency using a direct digital synthesiser (DDS) (20) or phase locked loop synthesiser (PPL) (22) which takes its reference from an externally provided reference frequency. The purpose of the external reference is to permit multiple transceiver modules (10) to transmit on exactly the same frequency. However, the transceiver module (10) may use a fractional synthesiser to provide a controllable offset from the nominal operating frequency.

The control unit (8) provides the intelligence for determining how each transceiver (10) behaves and also provides an interface to the host system or application.

The individual transceivers are installed such that they are placed in an arrangement where the radiation patterns of the individual antennas 1, 2 ... n overlap each other to provide continuous coverage of the desired reader volume.

Each transceiver (10) may be turned on individually by the controller (8) so that each may work as a single stand-alone reader. Each transceiver (10) may also be turned on in sequence such that each antenna (1,2 ... n) covers a portion of the reader volume for a portion of the time. All transceivers may be turned on simultaneously so that the whole reader volume is covered at one time.

The transceivers (10) may be arranged such that only one transceiver transmits an energising signal while one or more of the other transceivers have their receivers active and so are able to act as diversity receivers.

Figure 3:
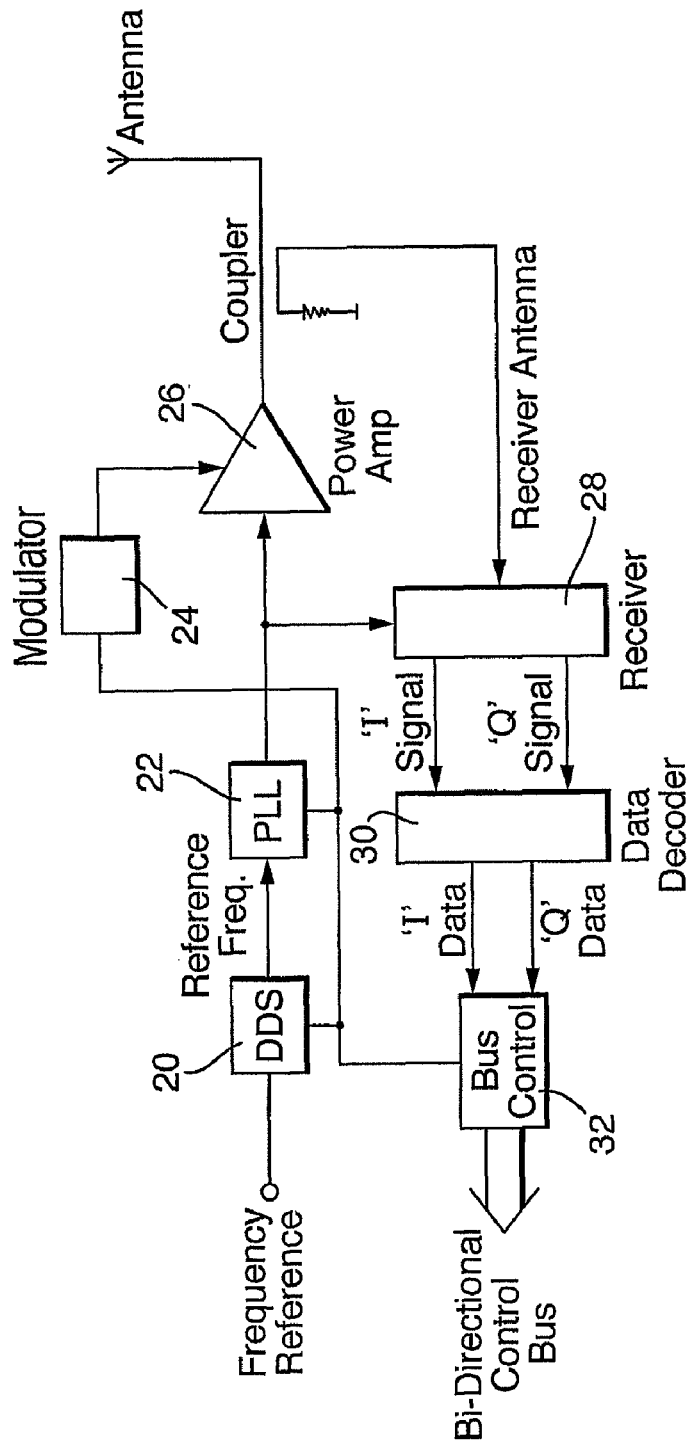

The frequency of each of the plurality of transceivers (10) may have their reference frequency offset from the others such that there is a low frequency beat note which can be adjusted so that it falls below the cut off frequency of the detector in the tags. By offsetting the frequency between transceivers (10) which transmit simultaneously, the effect of the standing nulls may be reduced. In one embodiment this offset is achieved by adjusting the phase lock loop synthesiser (22) reference frequency by means of a Direct Digital Synthesiser (20) under control of the control unit. This arrangement is shown in FIG. 3.

Because each transceiver is connected directly to its own antenna, there are no communications losses associated with antenna feed lines. All communications takes place over the data signal lines.

In one embodiment of the system, a control unit may be interconnected to an array of transceiver modules, each module being connected to its own antenna by a very short length of coaxial feed line. The frequency reference signal is fed to each of the transceivers by means of a low cost flexible coaxial cable (14) because the losses in the cable at the reference frequency is easily compensated for without affecting the final operating frequency or the reader transmitter output. The control unit (8) communicates with all the transceiver modules (10) by way of the bidirectional bus (16). The array of transceivers in one embodiment can be arranged around a typical loading dock door measuring approximately 3 meters high by 3.5 meters wide. When pallets of items, each pallet may contain as many as 200 individual items tagged with RFID tags, is moved through the dock door, some items may be hidden from view with respect to one or more of the reader transceiver module antennas, however because of the multiple antennas used on the reader, at least one of the plurality of transceiver module antennas will see each of tags, so that in combination all of the tags will be successfully read by the system.

One problem encountered in existing systems is that a tag may be successfully illuminated and powered by the reader's energising field, the return signal from the tag may occur in a null in the reader's receiver antenna system. The system described in this invention overcomes this problem, because the control unit may command all the transceivers to receive simultaneously but for only one transceiver to transmit. The transceivers which are in the receive only mode act as diversity receivers, a technique well known in the art of radio communications but hitherto a technique which has not been applied to RFID. The transceiver receivers all listen for the tag response signal but perhaps only two transceivers receive the signal. These transceivers process the signal, decode the data stream and pass this stream along to the control unit (8) over the bi-directional communications bus (16). The control unit (8) will then select the best signal and after processing the data will pass this data along to the application via the application host interface.

In another embodiment of the system, two or more transceiver modules (10) may be arranged facing each other on either side of a conveyor belt. The Control Unit (8) commands both transceiver modules (10) to transmit simultaneously thereby creating a field between the transceiver antennas. As items pass through the field between the antennas, they are illuminated. Because two transceivers are transmitting simultaneously but on exactly the same frequency no beat note is generated between the transmitted carrier frequencies and therefore no deep modulation nulls occur in the field to interfere with the communication between the reader transceivers and the tags attached to the items moving along the conveyor. This technique has been found to considerably improve the reliability and probability of reading tags moving through a read zone.

In yet another embodiment of the system, two transceiver module antennas are arranged at right angles to each other such that a cubic reading zone is created by the overlapping radiation fields of the two antennas. The transceiver modules (10) are caused to transmit simultaneously thus creating a reader zone in which tags may be placed in any orientation and still be illuminated and read by at least one of the transceiver module antennas.

In any of the embodiments, the transceiver modules (10) may be caused to adjust their output power level in order to change the operating or reading range of the module. The Control Unit (8) may also cause the radiated power levels from individual reader modules (10) to be set differently in order to adjust the shape and phasing of the reading zone formed by an array of multiple reader transceiver modules (10).

Each transceiver module 10 may contain, but is not limited to, one or more of the following components

- a frequency generating means which may be a direct digital synthesiser (DDS) (20), or a phase locked loop synthesiser (PLL) (22) or other method of generating a frequency;
- A power amplifier (26) which boosts the basic signal to a level suitable for driving an antenna
- A modulator (24) to permit commands and data to be modulated on the transceiver transmitter carrier wave.
- A transmitter/receiver combining means which may be a directional coupler or circulator or a directly tapped delay line or other means
- A receiver mixer/detector (28) which converts the incoming signal to a baseband signal, the receiver (28) having separate "I" and "Q" channels;
- A decoder (30) which extracts the incoming data stream from the baseband signal
- A Bus control section circuit (32) which interfaces the individual circuits in the module to the communications and control bus to allow the module to communicate with the separate control Unit.
- An optional frequency reference source such as a temperature compensated oscillator which will allow the transceiver module to be used as a stand alone reader transceiver.
- An integral antenna
- An integral power supply unit.

The reader Control Unit 8 may contain, but is not limited to, the following components

- A communications interface circuit to communicate with one or more transceiver modules
- A communications interface circuit to communicate with an application host which may use one of the many industry standard communications links for example RS232 or RS485 or Ethernet
- A Reference Frequency source which may be a temperature compensated oscillator or a simple crystal or a frequency locked source which may be locked to the 50/60 Hz mains frequency, or a GPS receiver or an off air source such as television station or Time and Frequency standard transmission.
- A power supply unit
- A communications concentrator to permit a network of similar control units to be interconnected In various embodiments the multiple readers or transceiver modules use the same frequency source and therefore may transmit simultaneously without the emitted transmissions causing interference patterns. The transceivers may have their reference frequency offset, as precisely controlled offsets can alleviate the standing null problem. In the prior art arrangements, in which different independent frequencies are sent to the reader heads, if one tried to use frequency offsets, the desired offsets would be more difficult to precisely control due, for example, to drift from temperature and aging effects.

In the above embodiments losses may be eliminated and there is provided an arrangement which is lower cost than if individual full readers are used. As described above, advantageously each reader transceiver can act as a diversity receiver and the transceivers can be arranged to transmit individually or simultaneously.

The invention claimed is:

1. An RFID reader system comprising one or more transceiver modules for communicating with a plurality of RFID tags, a control unit having a reference frequency generator for providing a reference frequency to said one or more transceiver modules, a control bus connecting the control unit to said one or more transceiver modules for communicating with said one or more transceiver modules and the control unit having a communications port allowing the control unit to communicate with an application host system.

2. A system as claimed in claim 1, comprising a plurality of transceiver modules, the control unit providing a common reference frequency to said transceiver modules.

3. A system as claimed in claim 2, wherein the control unit can control at least one of the transceiver modules to read one or more of the plurality of tags.

4. A system as claimed in claim 3, wherein the control unit can control the transceiver modules to transmit individually or in groups or simultaneously.

5. A system as claimed in claim 3, wherein the control unit can control each of the transceiver modules to be activated in rotation, or in a random or pseudo-random sequence to read one or more of the tags.

6. A system as claimed in claim 1, wherein the or each transceiver module is provided with a direct digital synthesiser or phase locked loop synthesiser, which takes its reference from the reference frequency transmitted from the control unit, to generate an operating frequency.

7. A system as claimed in claim 1, wherein the transceiver modules are provided with antennas, the antennas being arranged so their radiation patterns overlap each other thereby providing continuous coverage of a desired reader volume.

8. A system as claimed in claim 1, wherein one or more, but not all, all of the transceivers are arranged to transmit an energising signal while one or more of the other transceivers have their receivers active to serve as diversity receivers.

9. A system as claimed in claim 1, wherein the frequency of at least one or more of the plurality of transceivers has its reference frequency offset from the others thereby providing a low frequency beat note which can be adjusted to fall below the cut off frequency of the detector in the tags.

10. A system as claimed in claim 9, wherein said reference frequency offset is achieved by adjusting the reference frequency of a phase lock loop synthesiser by means of a direct digital synthesiser under control of the control unit.

11. A system as claimed in claim 1, wherein each transceiver module is connected to its own antenna by a coaxial feed line.

12. A system as claimed in claim 1, wherein the frequency reference signal from the control unit is fed to each of the transceivers by means of a flexible coaxial cable.

13. A system as claimed in claim 1, wherein two or more of the transceiver modules are arranged facing each other on either side of a volume to be interrogated, whereby controlling the modules to transmit simultaneously at the same frequency creates no beat note between the transmitted carrier frequencies so that no deep modulation nulls occur in the energised field to interfere with the communication between the reader transceivers and the tags.

14. A system as claimed in claim 1, wherein at least two of the transceiver modules are arranged at right angles to each other defining a cubic reading zone by overlapping fields from the antennas of the transceivers.

15. A system as claimed in claim 1, wherein the transceiver modules can adjust their output power level in order to change the operating or reading range of the module.

16. A system as claimed in claim 15, wherein the control unit can control the radiated power levels from individual reader modules to be set differently in order to adjust the shape and phasing of the reading zone formed by an array of the reader transceiver modules.

17. A method of reading tags, comprising the steps of providing a plurality of transceiver modules with a common reference frequency, and controlling at least one of the transceiver modules from a control unit to read one or more of the plurality of tags.

18. A method as claimed in claim 17 including controlling the transceivers to transmit individually or in groups or simultaneously.

19. A method as claimed in claim 17, including the step of controlling each of the transceiver modules to be activated in rotation, or in random or pseudo-random sequence to read one or more of the tags.

20. A method as claimed in claim 17 including one or more, but not all, of the transceivers transmitting an energising signal while one or more of the other transceivers have their receivers active to serve as diversity receivers.

21. A method as claimed in claim 17, including controlling the frequency of at least one or more of the plurality of transceivers to have its reference frequency offset from the others thereby providing a low frequency beat note which can be adjusted to fall below the cut off frequency of the detector in the tags.

* * * * *

UNITED STATES PATENT AND TRADEMARK OFFICE
CERTIFICATE OF CORRECTION

| | | |
|---|---|---|
| PATENT NO. | : 7,683,788 B2 | Page 1 of 1 |
| APPLICATION NO. | : 10/595529 | |
| DATED | : March 23, 2010 | |
| INVENTOR(S) | : Turner | |

It is certified that error appears in the above-identified patent and that said Letters Patent is hereby corrected as shown below:

Column 1,
Line 10, "BACKGROUND TO TEE INVENTION" should read
--BACKGROUND TO THE INVENTION--.

Column 3,
Line 21, "DESCRIPTION OF TIE INVENTION" should read
--DESCRIPTION OF THE INVENTION--.

Column 6,
Line 66, patterns" should read --patterns--.

Signed and Sealed this
Twenty-eighth Day of June, 2011

David J. Kappos
*Director of the United States Patent and Trademark Office*